July 3, 1934.          T. A. ABBOTT          1,965,329
ELECTRIC METER
Filed July 21, 1933          2 Sheets-Sheet 1
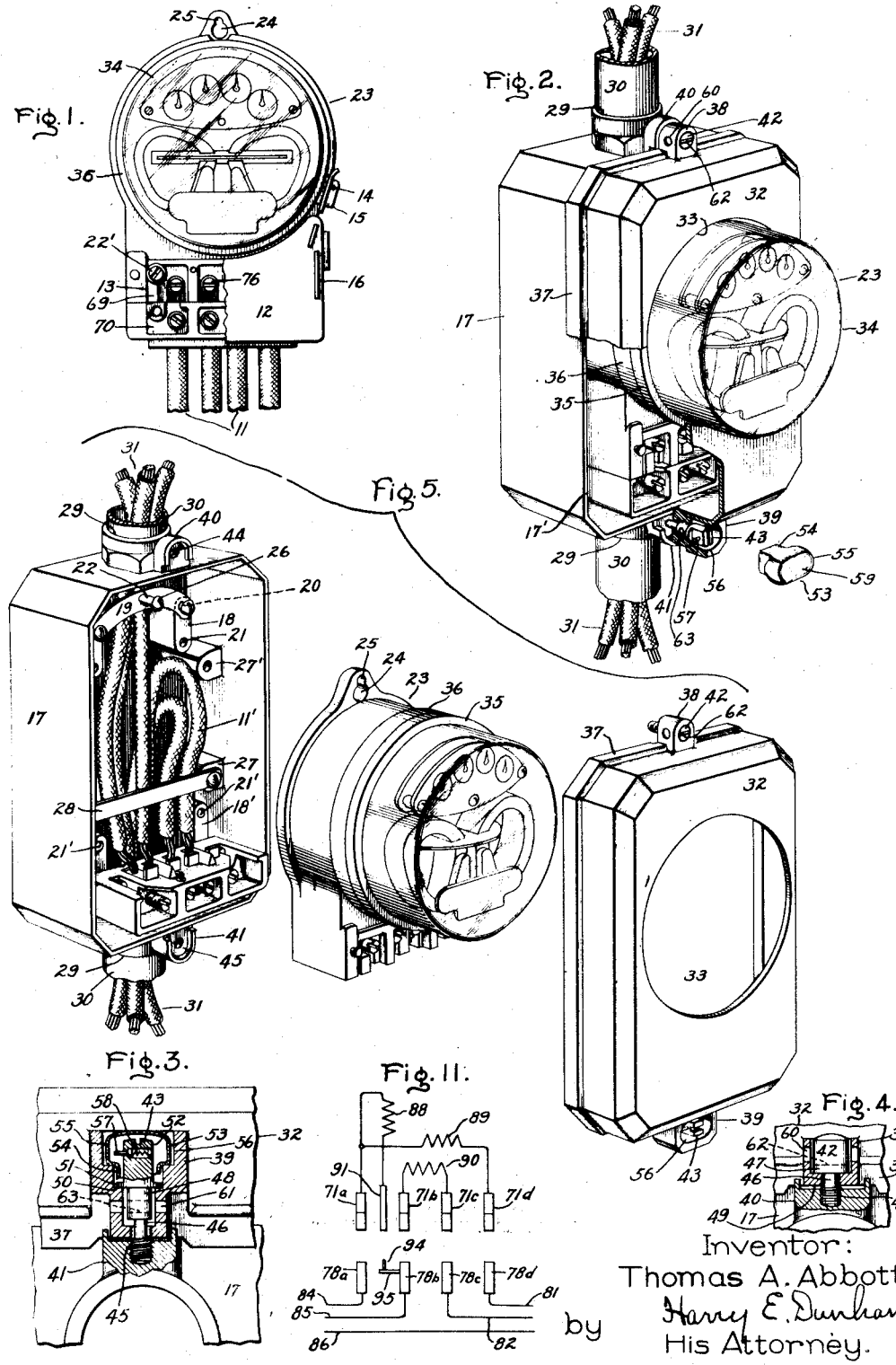
Inventor:
Thomas A. Abbott,
Harry E. Dunham
His Attorney.

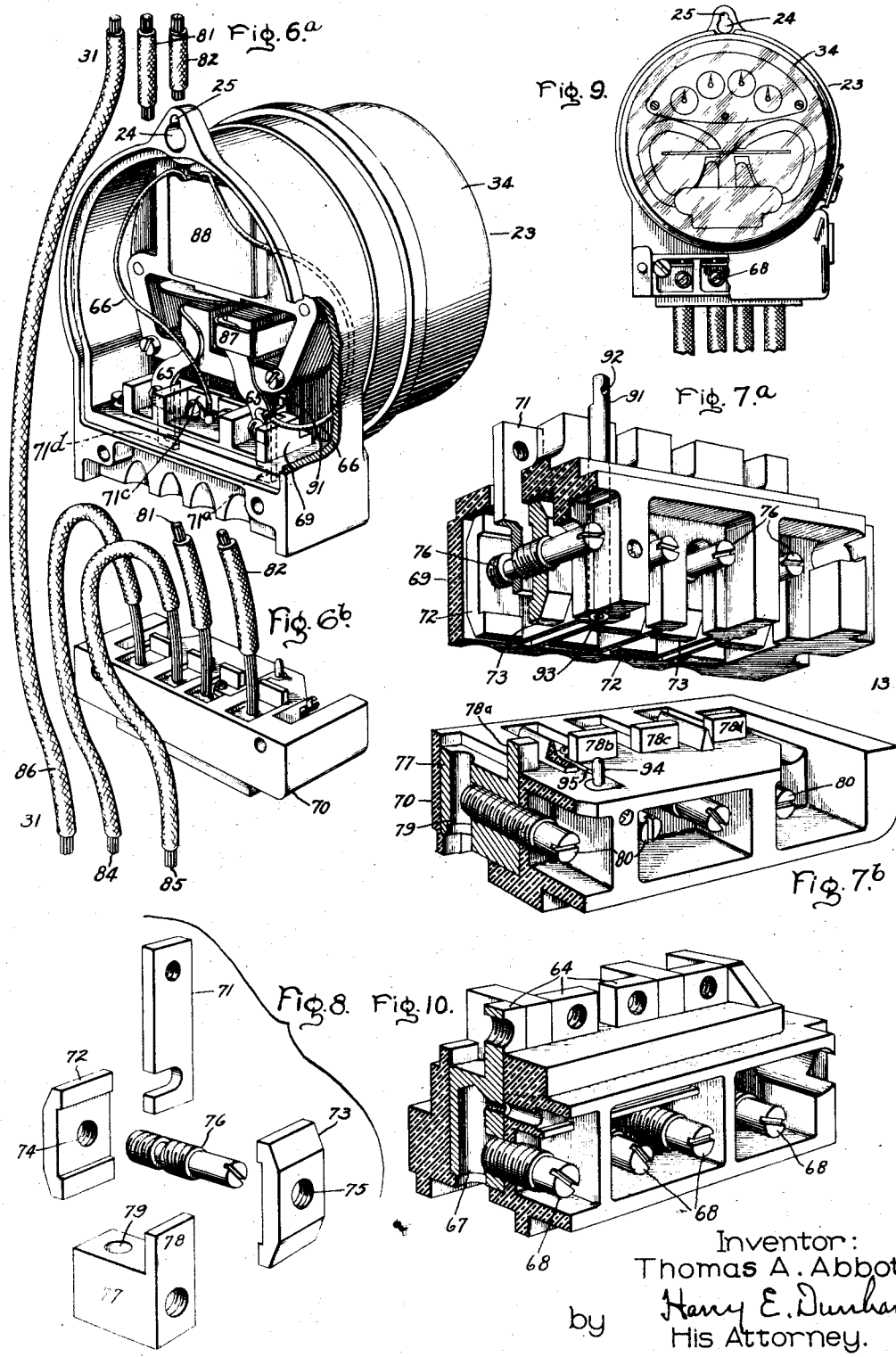

Patented July 3, 1934

1,965,329

UNITED STATES PATENT OFFICE 1,965,329

ELECTRIC METER

Thomas A. Abbott, Marblehead, Mass., assignor to General Electric Company, a corporation of New York Application July 21, 1933, Serial No. 681,508

13 Claims. (Cl. 171—34)

My invention relates to electrical devices and casings therefor and concerns electrical meters and instruments particularly.

The primary object of my invention is the provision of an arrangement whereby a meter may be used for indoor or outdoor service and a given design of casing may be used for meters mounted in different positions in relation to a wiring system.

It is also an object of my invention to provide a weatherproof casing for an electrical device and a sealing arrangement for said casing to guard against tampering with said device.

It is an object of my invention to provide a housing for an electrical meter or instrument which shall expose its indicating dial to view without exposing the meter or instrument to the weather.

It is an object of my invention to provide a screw-fastening device in which loss of the screw is prevented.

It is a further object of my invention to provide an improved sealing device to guard against unauthorized separation of separable members.

It is still another object of my invention to provide a metering arrangement which may be used with or without a test block and with either 2- or 3-wire circuits. Other and further objects and advantages will become apparent as the description proceeds.

In accordance with my invention in its preferred form I provide a casing comprising a box and a cover suitable for receiving a meter of the indoor type. The casing is provided with adjustable brackets to permit receiving meters of various ratings and a double set of brackets arranged symmetrically end for end is provided in the casing to permit interchanging the relative position of the casing with respect to the meter. The meter is adapted to receive a standard terminal block or a two-part block for providing test facilities, as may be desired. The block is so arranged that the leads may be brought along the back of the meter to save space when the meter is mounted in the casing or may be brought along the wall toward the bottom of the meter when the meter is mounted on a panel for indoor service.

The features of my invention which I believe to be novel and patentable are pointed out in the claims appended hereto. A better understanding of my invention itself, however, may be obtained by referring to the following description in connection with the accompanying drawings in which Fig. 1 represents one embodiment of a meter arranged in accordance with my invention for indoor service and having a terminal block providing test facilities; Fig. 2 illustrates in perspective the meter arranged for outdoor service with a weatherproof casing showing the casing sealing arrangement; Figs. 3 and 4 are detail views partly in cross-section illustrating the arrangement for fastening the parts of the casing together; Fig. 5 is an exploded view of the weather proof meter illustrating the internal construction of the casing and the manner of removing the meter from the casing without withdrawing any wire leads; Fig. 6 (parts 6a and 6b) is a rear view in perspective of the meter with a terminal block for test facilities separated to show the construction; Fig. 7 (parts 7a and 7b) is a perspective view of a terminal block for test facilities with the parts separated which may be employed with meters in accordance with my invention; Fig. 8 is an exploded view of the differential screw connecting and disconnecting arrangement used in the terminal blocks for test facilities; Fig. 9 illustrates a meter arranged for standard indoor service without test facilities; Fig. 10 illustrates a type of terminal block for standard service which may be substituted for the terminal block with test facilities in meters arranged in accordance with my invention; and Fig. 11 is a diagram illustrating the arrangement of the test block with 3-wire circuits.

Referring now more in detail to the drawings in which like reference characters refer to like parts throughout, I have shown in Fig. 1 an electrical meter, such as a watt-hour meter, for example, for measuring the quantity of electrical energy consumed in an electrical circuit. In the form shown in Fig. 1, the meter is suitable for indoor service and is arranged to permit testing of the meter without withdrawing the leads 11 forming a part of the permanent wiring of the electrical system in which the meter is used. The terminal cover 12 is shown partially broken away and exposing the terminal block 13 provided with test clips which will be described more in detail hereinafter.

As will be well understood by those skilled in the art, in the arrangement shown in Fig. 1, the meter itself may be sealed by inserting a sealing wire in the opening 14 of the sealing lug 15, or the meter and terminals may both be sealed by inserting a sealing wire in the sealing lug 16 as described for example in Bakke Patent 1,725,695, August 20, 1929.

The instrument may be adapted for outdoor or weather- and dust-proof service by mounting it in a casing, as shown in Fig. 2, and if desired, inserting the conductors 11 in the terminal block from above, as shown in Fig. 6, in order to save longitudinal space, instead of from below as shown in Fig. 1. Although I have illustrated the arrangement of my casing in connection with electrical meters, it will be understood that the invention is not limited to casings for meters and instruments. The weather-proof casing consists of a box 17 having two sets of brackets 18 and 18' formed therein at either end, either set being adapted for supporting a cross piece 19 in either of two sets of holes 20 and 21. The cross piece 19 is provided with a headed pin 22 for suspending the meter 23 from a hole 24 in the frame of the meter unit having a portion 25 of reduced diameter to fit under the head 26 of the pin 22.

The casing 17 also has formed therein two pairs of brackets 27 and 27' at either end arranged to support a straight cross piece 28. The cross piece 28 serves to retain the conductors 11' in place and may also if desired be arranged to provide lateral support to the meter 23 by taking up the horizontal thrust due to its weight. The lower end of the back of the meter 23 however preferably bears against brackets 18' for lateral support. If desired, the meter 23 may be secured to brackets 18' by means of screws 22' (Fig. 1) engaging threaded holes 21' in brackets 18'. This precaution however is unnecessary for the rigid support of the meter 23 as will be explained hereinafter. By changing the position of the cross-piece 19 to the lower pair of brackets 18' instead of the upper pair 18 and changing the cross-piece 28 from the lower brackets 27 to the upper pair of brackets 27' the position of the box 17 may be changed end for end without changing the meter 23 from its normal operating position. This feature is often of advantage when it is desired to use a casing with only one opening to receive conduits in various installations in some of which it is preferable to insert conduits from above and others from below. The box 17 is also arranged to be interchangeable end for end in order that the meter 23 may be retained with the same end up in case it becomes desirable to change the position of the casing from one where it is most convenient to bring conductors in from the upper end to one in which it is most convenient to bring the conductors in from the lower end, and vice versa without pulling the conductors out of the conduit.

Threaded openings 29 may, if desired, be provided at both ends of the meter box 17 to receive conduit 30 for conductors 31 so that the conductors 31 may be brought in from either end, or may be brought in at one end and taken out at the other, as shown in Figs. 2 and 5.

A cover 32 for the meter casing is provided with an opening 33 of the same diameter as the projecting glass portion 34 of the meter 23. A shoulder 36 is formed in the glass cover 34 or produced by a metal band sealed to the glass walled projecting portion 34, and a gasket 35 of any suitable material such as rubber, for example, is provided between the shoulder 36 and the under surface of the cover 32 around the edge of the opening 33 in order to provide a weatherproof joint between the opening 33 and the meter cover 34. The parts are so dimensioned that the cover 32 fits snugly against the gasket 35, thereby holding the meter 23 rigidly in place. The cover 32 is provided with a flange 37 which prevents moisture from entering the interior of the casing. If desired the joint between the flange 37 and the front edge 17' of the box 17 may also be gasketed.

Any suitable means may be provided for attaching the cover 32 to the meter box 17. I have found, for example, that the cover may be attached satisfactorily and with a minimum of connecting parts by providing lugs 38 and 39 on the cover 32 and lugs 40 and 41 on the box 17 with cap screws 42 and 43 to draw the lugs 38 and 40 and the lugs 39 and 41 together. If desired, ordinary cap screws may be employed engaging with threaded portions 44 and 45 in the lugs 40 and 41.

However, I prefer to arrange the cap screws and the holes in the lugs 38 and 39 of the cover 32 in such a manner that loss or misplacement of the cap screws 42 and 43 when the cover is removed may be prevented. This may be accomplished by providing an unthreaded portion 46 between the head 47 and the threaded portion 44 of cap screw 42 (Fig. 4) and between the enlarged portion 48 and threaded portion 45 of the cap screw 43, (Fig. 3). The hole in the lug 38 for the screw 42 is threaded from the lower surface 49 of the lug 38 for a distance slightly less than the length of the unthreaded portion 46 of the cap screw 42. Consequently, when the cap screw 42 is screwed down to bring the lugs 38 and 40 together, the threaded portion of the screw 42 clears the threads in the lug 38 and permits the screw 42 to draw the lug 38 down toward lug 40. However, when the screw 42 is backed out to permit the cover 32 to be removed, the threaded portion 44 of the screw 42 engages the threads in the lug 38 and retains the screw 42 in the lug 38 as the cover 32 is moved about. If for any reason, it is desired to remove the screw 42 entirely from the cover, the screw 42 may be screwed out further until it can be removed from the lug 38. But under ordinary circumstances, when it is desired merely to remove the cover 32, the screw 42 will be unscrewed merely far enough to release it from the lug 40 and the danger of loss or misplacement of screw 42 is overcome. In a similar manner, when the screw 43 is disengaged from the lug 41, the threads on the screw retain it in the threaded portion of lug 39.

The holding screw 43 and the hole in the lug 39 (Fig. 3) have been modified in order to provide a simple sealing arrangement which cannot readily be tampered with. A shoulder 50 is provided in the lug 39 to cooperate with a collar portion 51 in the head of the screw 43 and the lugs 39 and 41 are joined together by the collar 51 bearing against the shoulder 50 in lug 39. The upper portion 52 of the head of the screw 43 has a suitable diameter to receive a sealing cap 53 composed of glass or other frangible material having a neck portion 54 surrounding the head 52 of screw 43 and an enlarged portion 55, which may if desired be non-circular, occupying a recess 56 conforming in shape to the portion 55 of cap 53 and forming the upper portion of the hole for the cap screw 43 in the lug 39. A pin 57 normally biased to an outward position by means of a spring 58 is provided in the head 52 of the screw 43 to engage the shoulder formed around the neck 54 of the sealing cap 53.

After the cap screw 43 has been screwed down tight to fasten the cover 32 to the meter box 17, the sealing cap 53 may be slipped over the head 52 of the screw 43 by pressing the pin 57 inwards and when the sealing cap 53 has been slipped down to the position shown in Fig. 3, the pin 57 springs outward and obviously prevents the removal of the sealing cap 53 except by breaking the same. If the sealing cap 53 is provided with a non-circular portion 55 (see Fig. 2) occupying a non-circular recess 56, there is no way in which the screw 43 can be backed out of the lug 41 to permit removal of the cover 32 without breaking the sealing cap 53.

The caps 53, being made of glass or other relatively inexpensive frangible material, may be made at relatively little cost in large quantities by or for the manufacturer of the instrument case, but since they are of a peculiar shape, they are not readily reproduced by individual artificers, and unauthorized persons would find great difficulty in breaking the seal to tamper with the meter and then replacing the authorized seal with another which could escape detection. If desired, the surface 59 of the seal 53 may be ornamented with a suitable scroll or characteristic mark of the manufacturer or the power company installing the meters in order to introduce a further difficulty in the unauthorized duplication of the sealing caps 53. In addition, if desired specially colored or painted glass may be utilized for the sealing caps 53 to make unauthorized duplication difficult.

If desired, the cover 32 may also be sealed to the box 17 by means of small padlocks or sealing wires inserted in the holes 60 and 61 in lugs 42 and 43 respectively and through the deepened screw eye 62 of screw 42 and hole 63 of screw 43 respectively.

It has been seen that the meter unit 23 may be readily adapted for either indoor service without a casing or for outdoor service mounted in a casing by changing the direction from which the leads 11 are inserted. The same instrument unit can also be used interchangeably in applications where simple terminal blocks for relatively permanent connections are desired, or in applications where it is desired to use terminal blocks which permit breaking the electrical circuits and testing the meter without handling any of the permanent wiring to the meter. For example, where relatively permanent connections are satisfactory the arrangement of Fig. 9 may be utilized which employs a simple terminal block of the type shown in Fig. 10 having terminal lugs 64 adapted to be connected to the current leads 65 and the potential leads 66 (visible in Fig. 6) in a manner well understood in the art. The conductors 11 forming a portion of the permanent wiring of the electrical system in which energy is to be measured are inserted in the openings 67 in lugs 64 and held fast by means of screws 68.

If it is desired to arrange the meter with test facilities, the terminal block shown in Fig. 10 is replaced by a terminal block 13 shown in Fig. 1 consisting of two parts 69 and 70 (Fig. 7). The type of separable terminal block 13 here illustrated and described is disclosed and claimed in the copending application of Hans A. Bakke, Serial No. 681,531, filed July 21, 1933, and assigned to the same assignee as this application. The upper part of the block 69 is provided with a plurality of lugs 71 to which the leads 65 and 66 of the meter 23 may be attached in the customary manner and a plurality of clamps 72 and 73 having threaded openings 74 and 75 (see Fig. 8) engaging differential screws 76. The lower part 70 of the test block is provided with a plurality of lugs 77 having projecting ears 78 and openings 79 adapted to receive conductors 11 of the permanent wiring of the electrical system. As in the case of the simple block of Fig. 10, screws 80 are provided for holding the conductors 11 fast in the openings 79 of the lugs 77. It will be observed that the holes 79 extend clear through the lugs 77 so that the conductors 11 may be inserted from the bottom as shown in Fig. 1, or from the top, as shown in Fig. 6, to provide the greatest space economy in the particular application to which the meter is to be put.

The holes 74 and 75 of the clamping members 72 and 73 are threaded in opposite directions so that by turning the differential screw 76 the clamps 72 and 73 may be brought together or spread apart. When brought together the clamps 72 and 73 will make contact with the lugs 71 as well as the projections 78 of lugs 77 so as to close electrical circuits between the lugs 71 and 77 and connecting the meter circuits with the electrical system, as required for service.

When it is desired to test the meter, however, suitable jumpers may be connected to the screws 80 of the lower part 70 of the test block in a manner well understoood in the art to shunt out the circuits of the meter and the differential screws 76 may then be turned to separate the clamping members 72 and 73, thereby disconnecting the circuits of the meter entirely from the electrical system and permitting a test meter to be connected in series with the meter 23 by means of jumpers from screws 76 to 80 or permitting an independent test circuit to be connected to the meter 23 through jumpers and screws 76 in a manner well understood in the art.

In addition to providing a means for disconnecting the meter, and permitting it to be tested without requiring the operator to handle the permanent wiring or to expose himself to any danger of coming into contact with electrical circuits since the screws 76 may easily be turned by means of an insulated screw driver, the separable test block 13 also provides a means for removing the meter entirely from the premises without handling the permanent wiring or subjecting the operator to the hazard of contact with the electrical circuit. It will be readily seen that after the clamping members 72 and 73 have been spread, the parts 69 and 70 are no longer fastened together and the meter 23 may be removed by sliding it upwards until the large diameter opening 24 clears the head 26 of the suspending pin 22, when the meter may be pulled forward and clear of the lower part 70 of the test block 13. Obviously, this feature is equally of value for either the weatherproof type of meter shown in Fig. 2 or for the indoor mounted meter shown in Fig. 1. In the case of the weatherproof type of meter shown in Figs. 2 and 5, this easy separation of the meter from the mounting greatly facilitates the connection of the conductor ends 11 of the permanent wiring to the lugs 77 during the initial installation. Since the lower part 70 of the test block 13 may permanently be attached to the wall or casing on or in which the meter 23 is mounted, the part 70 serves to retain the leads 11 in position when the meter 23 is removed. This may be of particular value in the arrangement of Fig. 1 where no conduit is employed for the wiring 11.

In the case of either the indoor or weatherproof types of meters, of Figs. 1 and 2, the easy removability of the meter is also of great value where it is desired to employ unskilled men as meter collectors for removing the meters from the customer's premises for test and replacing the tested meters with new or sustitute meters in order that the original meters may be transported to a central laboratory to be tested by experienced operators whose time is conserved by not being obliged to travel to the customer's premises and who are also thereby enabled to employ more accurate test equipment than could readily be carried to the customers' premises.

The meter illustrated in Fig. 6 represents a connection suitable for use with a two-wire circuit in which the current enters through the conductors 81 and 82 (shown broken in order to expose the interior of the meter) and leaves the meter flowing to the customer's apparatus through conductors 84 and 85, the conductor 86 not being in use for a two-wire circuit. The current winding 87 of the meter is connected to the outer two lugs 71a and 71d (not actually visible in Fig. 6 but indicated in outline by dotted lines) of the upper part 69 of the test block, and the potential winding 88 is connected at one end to lug 71a and at the other end to lugs 71b and 71c which are bridged together so that the potential connection is not broken unless the current connection is broken in disconnecting the circuits by means of the differential screws 76.

The test block may also be used with meters arranged for three-wire circuits in which two current windings 89 and 90 are required, as represented diagrammatically in Fig. 11. In this case, the incoming leads 81 and 82 have full voltage between them, and the conductor 86 serves as a neutral conductor. In the operation of the meter, the windings 89 and 90 are in series with different conductors, the winding 89 carrying the current flowing through conductors 81 and 84, and the winding 90 carrying current through conductors 82 and 85. But in testing the meter it is desirable to be able to connect the two current windings 89 and 90 in series and to make the test with a two-wire source of supply. It is desirable therefore that at least one of the current windings 90 be so connected to the test block that it may be completely disconnected from the other parts of the meter by means of the differential screws 76. Consequently, it is undesirable to connect either of the leads of the potential winding 88 to either of the center lugs 71b or 71c, as shown in Fig. 6.

In operation however it is desirable that the potential winding 88 be connected across the two outer conductors 84 and 85 of the three-wire circuit. To accomplish this and yet make the connection removable for test purposes, a separate removable swinging or sliding link may be employed to close the potential circuit of the meter. In some cases it may be desirable to guard against killing the potential circuit and stopping of the registration of the meter which might result if such separate potential links were inadvertently left unconnected by a meter tester or installer, or were intentionally disconnected by an unauthorized person. For cases where it is wished to guard against killing the potential circuit while either of the current circuits are conducting power, I have provided a potential connector which becomes disconnected only when the two parts 69 and 70 of the test block are separated. One side of the potential winding 88 is connected to one of the outer lugs 71a as for the two-wire connection, but the other lead is connected instead to a conducting pin 91 located in and passing through the upper part 69 of the test block. An opening 92 (Fig. 7) is provided at the upper end of the pin 91 for making a connection to one side of the potential winding 88, and the lower end of the pin 91 is drilled to form a cylindrical socket 93. A short pin 94 carried by part 70 of the test block is provided which engages the socket 93 in the pin 91 when the parts 69 and 70 of the test block are placed together. The pin 94 is electrically connected to the lug 78b by means of a conducting strip 95 so that when the parts 69 and 70 of the test block are together a circuit is completed from conductor 84 through lug 78a, clamping members 72 and 73, lug 71a, potential winding 88, pin 91, pin 94, connecting strip 95, lug 78b, back to conductor 85.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A weatherproof electrical meter comprising a meter unit with a cup-shaped transparent cover having a shoulder around the rim of said cover, a box adapted to receive said meter unit, a cover for said box having an opening through which said transparent meter unit cover is permitted to project, means for providing a weathertight seal between the edges of said opening and the shoulder at the rim of said meter unit cover, and means for suspending said meter unit in said box, said meter receiving box having brackets therein adapted to support said meter suspending means and brackets adapted to provide lateral support to the lower end of the back of said meter unit, said meter unit being retained between said brackets and said cover to restrain lateral movement thereof, said meter receiving box also having therein a duplicate set of brackets, arranged symmetrically end for end with respect to said previously mentioned brackets to permit said meter receiving box to be mounted with its ends interchanged in position with respect to said meter unit.

2. A weatherproof electrical meter comprising a meter unit with a projecting cover having a shoulder around the edge of said cover and a casing for said meter unit comprising a box adapted to receive said meter unit, a cover for said box having an opening through which the projecting cover of said meter unit is permitted to extend and a resilient gasket located between said shoulder and the edge of said opening, said box having means therein serving to space said meter unit from the back wall of said box thus providing space for conductors between said meter unit and said back wall, said meter unit being retained between said spacing means and the cover of said box to restrain lateral movement of said meter.

3. A weatherproof electrical meter comprising an electrical meter unit having an indicating dial, a transparent projecting wall covering said dial, a resilient gasket surrounding said projecting wall, and a casing adapted to receive said meter and having an opening therein of the shape of said projecting wall and through which said wall projects with the edges of said opening engaging said resilient gasket to provide a weatherproof joint, thereby permitting said meter to be read without opening said casing.

4. A weatherproof electrical meter comprising a meter unit with a transparent projecting cover, a removable casing adapted to receive said meter unit and having an opening therein permitting said cover to project therethrough, and means for providing a weather-tight joint between said projecting cover and the opening in said casing.

5. An electrical instrument adapted for indoor and outdoor service comprising an instrument unit adapted to be suspended against a vertical surface and having a transparent projecting face and an indicating dial thereunder, a removable casing comprising an instrument receiving box, a cover therefor, said instrument-receiving box having an opening to receive electrical conductors for connection to said instrument unit and a back wall with means thereon to provide said instrument unit with lateral support and to space said meter from said back wall to provide a space for conductors passing between the back of said instrument and the back wall of said box, said cover having an opening therein permitting the face of said instrument to project therethrough and corresponding in shape to the projecting face of said instrument, and a resilient gasket inserted between the face of said instrument unit and the edge of said opening to provide a weather-tight joint.

6. A casing for an electrical meter comprising a meter receiving box, a cover therefor, a cap screw for fastening and sealing said cover to said box and a frangible sealing cap for said cap screw, said box having a threaded hole to receive said cap screw, said cap screw having a head, a threaded portion, and an unthreaded portion of reduced diameter between said head and said threaded portion, said head having a laterally extending movable pin therein biased to a position extending radially from said head but adapted to be pressed inward, said cover having a hole therein of reduced diameter at its lower portion threaded to receive said cap screw and of increased cross-section at the upper portion thereof to receive the head of said cap screw and said sealing cap, said frangible hollow sealing cap having an enlarged portion with an outer cross-section corresponding to the cross-section of the upper portion of the hole in said cover and a neck portion adapted to surround the head of said cap screw below said pin, an internal shoulder being formed in said sealing cap between said neck portion and said enlarged portion preventing the removal of said sealing cap without breaking after it has been pressed over said screw head and said outwardly biased pin has been permitted to spring out, the threaded portion of the hole in said cover being of less depth than the length of the unthreaded portion of said cap screw, said cover and said screw head having shoulders bearing against each other when the cover is fastened in position, whereby said cap screw is free from the threads in said cover when screwed down and whereby the cap screw engages the threads in said cover when it is backed out from the threaded hole in said box thus tending to prevent the loss of said cap screw when said cover is removed.

7. An arrangement for fastening and sealing together two members which comprises in combination a portion of one of said members having a threaded hole therein, a cap screw having a head with a laterally extending movable pin therein biased to a position extending radially from said head but adapted to be pressed inward, a threaded portion to be received by said threaded hole and an unthreaded portion of reduced diameter between said threaded portion and said head, a frangible hollow sealing cap for said screw head, and a portion of the second of said members having a hole extending therethrough, said hole being of reduced diameter at the end portion thereof which is to lie adjacent said first member and being threaded at said end to receive said cap screw, the axial length of the thread being less than the length of the unthreaded portion of said cap screw, whereby the threaded portion of said cap screw comes free from the thread in said second member to permit bringing said members tightly together and whereby the threads in said cap screw engage the threads in said second member when the cap screw is backed out from said first member and the cap screw is retained in said second member preventing its loss, the hole in said second member having also a portion of increased cross-section to receive the head of said cap screw and said sealing cap, said frangible hollow sealing cap having an enlarged portion with an outer cross-section corresponding to said greater cross-section of the hole in said second member, and a neck portion adapted to surround the head of said cap screw below said lateral pin, an internal shoulder being formed between said neck and enlarged portions preventing the removal of said sealing cap after it has been pressed over said screw head and said outwardly biased pin has been permitted to spring out.

8. A casing for an electrical meter comprising a meter-receiving box, a cover therefor, a cap screw for fastening and sealing said cover to said box, and a frangible hollow sealing cap, said box having a threaded hole to receive said cap screw, said cap screw having a threaded portion engaging the threads in said box and a head having a laterally extending movable pin therein biased outwardly to a position extending radially from said head but adapted to be pressed inward, said cover having a hole therein of reduced diameter at the lower portion to receive said screw and of increased cross-section at the upper portion thereof to receive the head of said screw and said sealing cap, said frangible hollow sealing cap having an enlarged portion with an outer cross-section corresponding to the cross-section of the upper portion of the hole in said cover and a neck portion adapted to surround the head of said cap screw below said lateral pin and forming an internal shoulder preventing the removal of said sealing cap after it has been pressed over said screw head and said outwardly biased pin has been permitted to spring out.

9. A device for sealing together two members comprising in combination a portion of one of said members having a threaded hole therein, a cap screw having a threaded portion to be received by said threaded hole, a head with a laterally extending movable pin therein outwardly biased to a position extending radially from said head but adapted to be pressed inward, a frangible sealing cap, and a portion of the second of said members having a hole extending therethrough, said hole having a portion of reduced cross-section to receive said cap screw, and a portion of increased but non-circular cross-section to receive the head of said cap screw and said sealing cap, said frangible sealing cap having an outer cross-section corresponding to the greater cross-section of the hole in said second member, and a neck portion adapted to surround the head of said cap screw below said lateral pin, an internal shoulder being formed at the edge of said neck portion preventing the removal of said sealing cap after it has been pressed over said screw head and said outwardly biased pin has been permitted to spring out, the portion of said hole of non-circular cross-section serving to prevent the rotation of said sealing cap and the backing out of said screw when the sealing cap is in place.

10. Weatherproof electrical apparatus comprising an electrical device having a terminal block with two parts, a box for receiving said device, a removable cover therefor, and means for removably securing said device in said box, one part of said terminal block being attached to said device and including lugs electrically connected to said device, and the other part of said terminal block including lugs connected to the wiring of an electrical system with which said device is to be used, said box having an opening for the entrance of such wiring, said first-mentioned part of said terminal block also including clamping means adapted for making electrical connections between corresponding lugs of said terminal block parts and for mechanically securing the parts of said terminal block together, thereby permitting the removal and replacement of electrical devices in said casing and the electrical isolation of a device in said casing without handling the wiring of the electrical system or disturbing the connections between said device and its terminal block.

11. In combination an electrical meter having a potential winding and a plurality of independent current windings, and a test block therefor comprising an insulatinng upper piece, a plurality of lugs supported thereby and each attached to one side of one of said current windings, a pin supported in said upper piece, connected to one side of said potential winding, the other side of said potential winding being connected to one of said lugs, a plurality of clamping devices in said upper piece, one of which is associated with each of said lugs, a removable insulating lower piece, a plurality of lugs supported thereby and connectable to the conductors of an electrical circuit with which said meter is to be used and a pin supported in said lower piece and electrically connected to one of said lugs so arranged that said second-mentioned pin contacts with the first-mentioned pin when said removable insulating lower piece is placed in operative relationship with said upper piece, the clamping devices in said upper piece each serving to permit forming and interrupting an electrical connection between one of the lugs of said upper piece and one of the lugs of said removable lower piece, thereby permitting said current windings to be disconnected without separating said terminal block but preventing the breaking of the potential circuit independently of the circuits through the current windings.

12. In combination an electrical meter having a potential winding and a plurality of independent current windings, and a test block therefor comprising an insulating upper piece, a plurality of lugs supported thereby and each attached to one side of one of said current windings, a pin supported in said upper piece connected to one side of said potential winding, the other side of said potential winding being connected to one of said lugs, a removable insulating lower piece, a plurality of lugs supported therein and connectable to the conductors of an electrical circuit with which said meter is to be used, a pin supported in said lower piece and electrically connected to one of said lugs so arranged that said second-mentioned pin engages the first-mentioned pin in telescoping relation when said removable insulating lower piece is placed in operative relationship with said upper piece, and means in one of said insulating pieces associated with each of the lugs therein for forming and interrupting electrical connections between the lugs of said upper piece and the corresponding lugs of said removable lower piece, thereby permitting said current windings to be disconnected without separating said terminal block but preventing the breaking of the potential circuit independently of the circuits through the current windings.

13. In combination an outdoor electric meter unit having a vertical back wall, a cylindrical shaped glass cover protruding from the upper front portion thereof through which the meter may be read, a terminal chamber at the lower extremity of said unit containing a terminal block with facilities for connecting the meter with external conductors, and a casing into which said unit fits for adapting the same for outdoor installation, said casing having an integral back and side wall portion and a removable front cover portion, the first mentioned portion of said casing having a conduit type conductor opening through a side wall thereof, and facilities on the internal surface thereof for suspending the meter unit in spaced relation to the back wall of the casing, the cover portion having an opening conforming to the shape of the glass cover of the meter unit and through which this glass cover extends when the parts are assembled for outdoor service, means for securing and sealing the cover of said casing in place with the meter unit securely clamped between the front cover of the casing and the meter unit suspending facilities and gasket means between the casing cover and the cover of the meter unit comprising substantially a water tight seal when the casing cover is secured in place.

THOMAS A. ABBOTT.